US012729790B2

(12) United States Patent
Hsu et al.

(10) Patent No.: US 12,729,790 B2
(45) Date of Patent: Sep. 8, 2026

(54) ALIGNMENT GUIDING STRUCTURE FOR QUICK COUPLER

(71) Applicant: Shenzhen Fositek Telecom Co., Ltd., Shenzhen City (CN)

(72) Inventors: An-Szu Hsu, Shenzhen City (CN); Yan-Jiao Cheng, Shenzhen City (CN)

(73) Assignee: Shenzhen Fosttek Telecom Co., Ltd., Shenzhen City (CN)

( * ) Notice: Subject to any disclaimer, the term of this patent is extended or adjusted under 35 U.S.C. 154(b) by 29 days.

(21) Appl. No.: 18/762,099

(22) Filed: Jul. 2, 2024

(65) Prior Publication Data

US 2024/0353042 A1 Oct. 24, 2024

(30) Foreign Application Priority Data

Jun. 19, 2024 (TW) ................................ 113122734

(51) Int. Cl.
*F16L 37/12* (2006.01)
*F16L 37/14* (2006.01)
*F16L 37/34* (2006.01)

(52) U.S. Cl.
CPC ............ *F16L 37/34* (2013.01); *F16L 37/146* (2013.01); *F16L 37/1225* (2013.01)

(58) Field of Classification Search
CPC ..... F16L 37/1225; F16L 37/146; F16L 37/34; F16L 37/02; F16L 37/025; F16L 37/04
See application file for complete search history.

(56) References Cited

U.S. PATENT DOCUMENTS 4,327,770 A * 5/1982 Brown .................... F16L 37/34 251/149.8
5,251,668 A * 10/1993 Walther .................. F16L 37/34 285/306

(Continued)

FOREIGN PATENT DOCUMENTS

DE 3840144 A1 * 5/1990 .............. F16L 57/06
EP 0034436 A1 * 8/1981 ........... E21B 17/046

(Continued)

OTHER PUBLICATIONS

Machine English Translation of IT-VR20130031-A1 (Year: 2025).*

(Continued)

*Primary Examiner* — Hailey K. Do
(74) *Attorney, Agent, or Firm* — Demian K. Jackson; Jackson IPG PLLC

(57) ABSTRACT

An alignment guiding sleeve for quick coupler includes a guiding sleeve having a closed engaging end provided with an engaging bore and an open guiding end defining a guiding bore and formed into a beveled guiding surface, and internally defining a guiding passage extending between and communicable with the engaging end and the guiding end. A male coupler can be assembled to the guiding sleeve by inserting through the engaging bore. The beveled guiding surface is adapted to guide a female couple into the guiding passage to connect to the male coupler. With the beveled guiding surface, any radial offset between the female coupler and the male coupler can be corrected, so that the female and the male coupler can be eventually aligned axially to connect together end to end without causing wear and incomplete watertight connection at the joint of the female and male couplers to result in leakage.

5 Claims, 7 Drawing Sheets

(56) References Cited

U.S. PATENT DOCUMENTS

| | | | | |
|---|---|---|---|---|
| 6,523,863 | B2 * | 2/2003 | Ishiwata | F16L 37/34 285/918 |
| 10,935,176 | B1 * | 3/2021 | Tabor | F16L 37/025 |
| 2004/0169371 | A1 * | 9/2004 | Hagiya | F16L 37/146 285/305 |
| 2024/0077156 | A1 | 3/2024 | Mitchell et al. | |

FOREIGN PATENT DOCUMENTS

| | | | | |
|---|---|---|---|---|
| EP | 1164327 | A1 * | 12/2001 | F16L 37/252 |
| IT | VR20130031 | A1 * | 8/2014 | F16L 37/0985 |
| TW | 226186 | U | 7/1994 | |
| TW | 201723371 | A | 7/2017 | |
| TW | M660562 | U | 9/2024 | |

OTHER PUBLICATIONS

Machine English Translation of DE-3840144-A1 (Year: 2025).*
Machine English Translation of EP-1164327-A1 (Year: 2025).*
Search Report dated Dec. 18, 2024 issued by Taiwan Intellectual Property Office for counterpart application No. 113122734.

* cited by examiner 211
21
212
2
22
111
112
11
1
12
3

ALIGNMENT GUIDING STRUCTURE FOR QUICK COUPLER

This application claims the priority benefit of Taiwan patent application number 113122734 filed on Jun. 19, 2024, the disclosure of which is hereby incorporated by reference in its entirety.

FIELD OF THE INVENTION

The present invention relates to a guiding structure for quick coupler, and more particularly, to an alignment guiding structure capable of correcting any radially offset between a female and a male coupler before the two couplers can be aligned axially to connect end to end. With the alignment guiding structure, it is able to avoid wear or incomplete watertight connection at the joint of the female and the male coupler.

BACKGROUND OF THE INVENTION

The currently available server has largely upgraded computing performance, which also results in increased heat produced by the computing units in the server during operation thereof. Since there are multiple servers mounted in the same one server cabinet and the space left between any two adjacent servers is very narrow, it is impossible to provide each of the servers with an individual thermal module to dissipate the heat produced by the server. To solve this problem, water cooling system has been developed to carry the server produced heat away from the server cabinet. Since the electronic parts in the server are of high precision, they must be protected from any damage possibly caused by leakage at joints of pipes in the water cooling system. For this purpose, the pipes of the water cooling system arranged in the server are usually made of a rigid or a metal material, and a male and a female quick coupler are correspondingly provided on the server and on the server cabinet, respectively, to quickly connect together end to end, so as to enable quick connection or disconnection of the water pipes on the server to or from the water pipes on the server cabinet. The server cabinet is usually fixedly mounted while the server is usually movable relative to the server cabinet, and there might be a small amount of radial offset between the male and the female coupler. Conventionally, to enable quick correction of the radial tolerance between the two quick couplers, at least one guiding post is provided on the server cabinet (i.e. a fixed side) close to a position at where the female coupler is mounted. Meanwhile, a guiding seat is correspondingly provided on the server (i.e. a movable side) at a position for mounting the male coupler. The guiding seat internally defines a guiding bore. When connecting the male coupler to the female coupler, first insert the guiding post into the guiding bore of the guiding seat to thereby correct the radial offset between the two quick couplers as much as possible, so that the two quick couplers can be coaxial and serially connected end to end.

Since the space in the server cabinet is very narrow, and the guiding post and guiding seat must be provided for every male and female coupler to correct the radial offset between them, a large internal space of the server cabinet is occupied by the guiding posts and guiding seats.

To save the internal space of the server cabinet, some manufacturer omits the guiding posts and guiding seats and tries to strictly control the radial offset between the male and the female coupler during the manufacturing process. Meanwhile, a beveled surface is provided in an inner bore of the female coupler at a position that will contact with the male couple first. With the beveled surface, the two quick couplers can be frictionally contact with each other to correct minor radial offset and enable smoothly connection between them. While the omission of the guiding posts and guiding seats can save the space in the server cabinet, it also derives other problems. It is understood a watertight joint between the front end of the male and the female coupler is every important for the water cooling system, and any compact on or wear of the front ends of the male and female couplers would result in inferior watertight joints between the male and the female coupler and between the male and female coupler with various sealing elements. In some worse conditions, water valves in the water cooling system might not be fully closed due to insufficient watertight connection and accordingly, cause the problem of leakage at the above mentions joints and valves.

Further, when using two different types of couplers under the premise of meeting the requirement of Open Compute Project (OCP), such as using the universal quick disconnect (UQD) coupler with the universal quick disconnect blind-mate coupler (UQDB), these two quick disconnect couplers have different specifications and different lengths, it is unable to control the depth by which the male coupler is inserted into the female coupler, In the event the two couplers are inserted too deep into each other, springs in the valves for controlling the opening or closing of the waterways in the water cooling system are possibly excessively compressed beyond their yield strength to become permanently deformed. When the male and the female coupler are disconnected from each other, the springs no longer have the elasticity could not elastically restore to their original shapes to reset the valves and close the water ways. Under this situation, leakage would occur now and then. It is therefore an important target for those skilled in the art to overcome these problems.

SUMMARY OF THE INVENTION

To effectively overcome the problems in the prior art, a primary object of the present invention is to provide an alignment guiding sleeve capable of correcting any radial offset between a male and a female coupler, so that the male and the female coupler can be aligned axially to be connected together end to end.

To achieve the above and other objects, the alignment guiding sleeve for quick coupler according to the present invention is designed to smoothly correct the radial offset between a male and a female coupler for them to connect together end to end without causing wear at their joint.

The alignment guiding structure for quick coupler according to the present invention includes a guiding sleeve, two ends of which are a closed engaging end and an open guiding end. The guiding sleeve internally defines a guiding passage extending between and communicable with the engaging end and the guiding end. The engaging end is provided with an engaging bore, via which a male coupler can be inserted into the guiding passage and assembled to the guiding sleeve. The guiding end is provided with a guiding bore, a free end of which is formed into a beveled guiding surface for guiding a female coupler into the guiding passage without causing wear of the female coupler. The female coupler guided into the guiding passage is axially aligned with the male coupler and can therefore connect to the male coupler end to end.

With the alignment guiding sleeve of the present invention, the additional guiding posts and guiding seats can be omitted, and the female coupler can be directly guided by the beveled guiding surface into the guiding sleeve to correct any radial offset from the male coupler, allowing the female and the male coupler to aligned axially with each other and connect together end to end without causing wear of the male and the female coupler.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
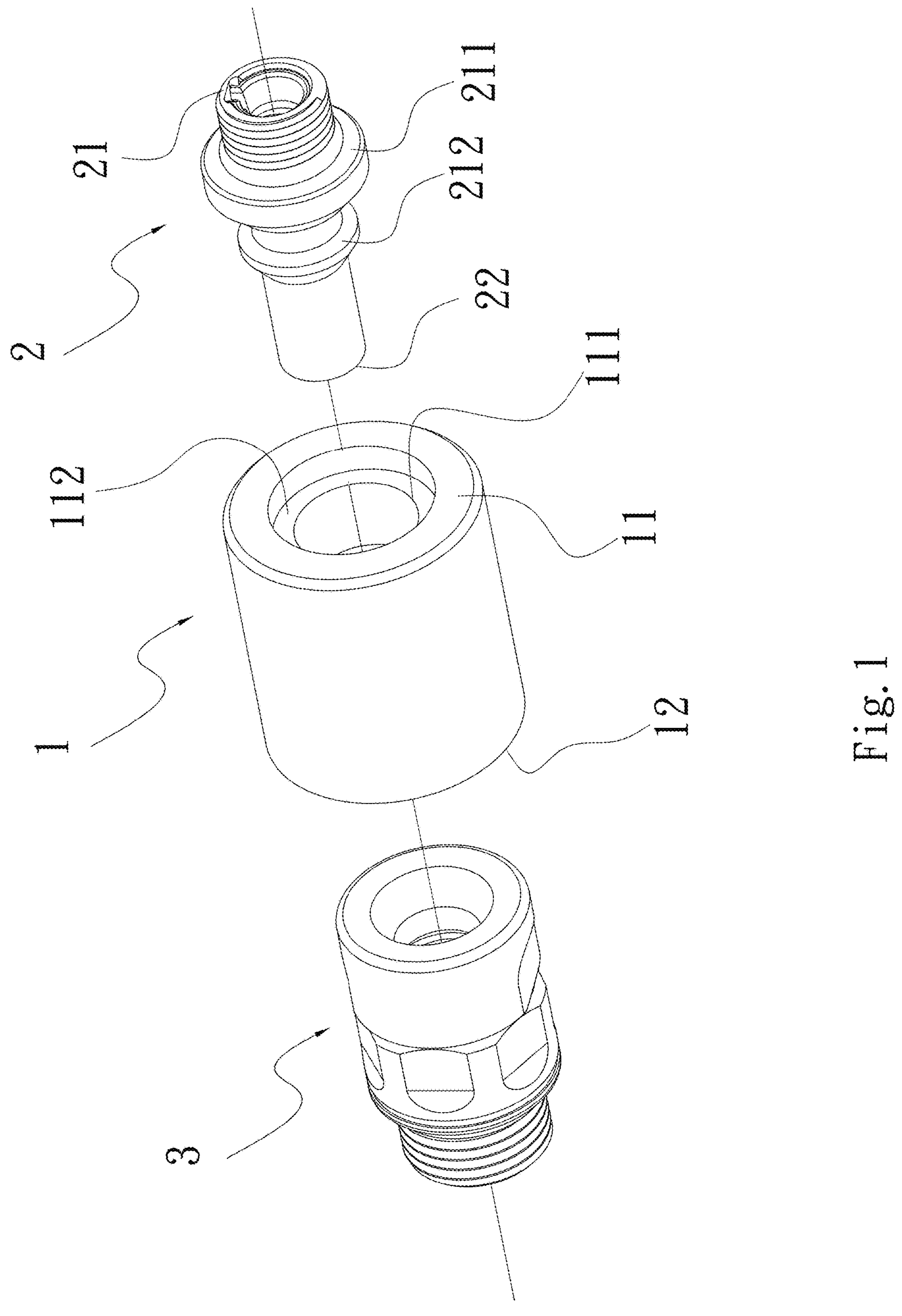
FIG. 1 is an exploded perspective view of an alignment guiding structure for quick coupler according to a first embodiment of the present invention.

The present invention will now be described with some preferred embodiments thereof. For the purpose of easy to understand, elements that are the same in the preferred embodiments are denoted by the same reference numerals.

Figure 2:
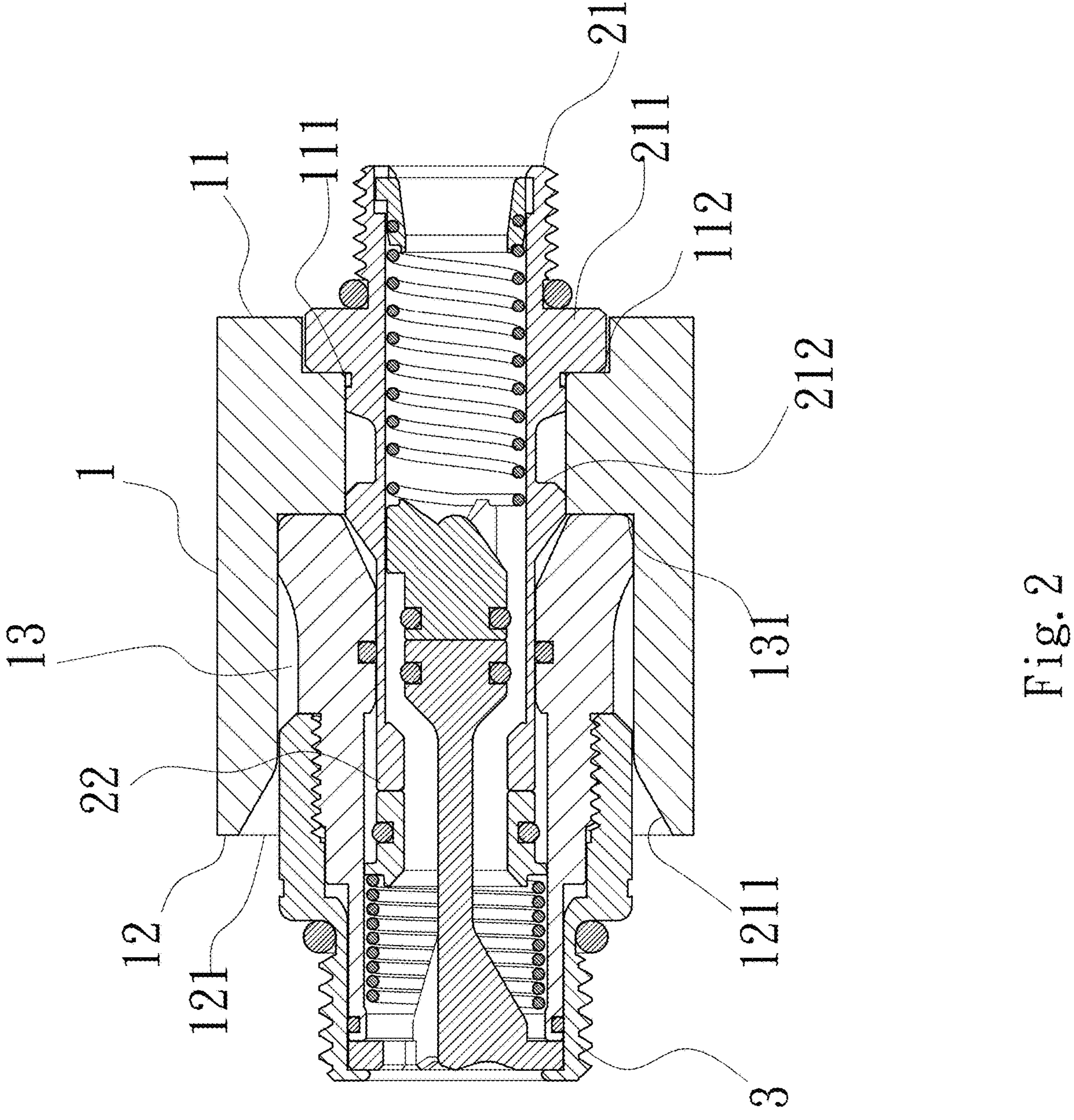
FIG. 2 is an assembled sectional view of FIG. 1.

Please refer to FIGS. 1 and 2, which are exploded perspective view and assembled sectional view, respectively, of an alignment guiding structure for quick coupler according to a first embodiment of the present invention. As shown, the alignment guiding structure of the present invention is used to correct a radial offset between a male and a female quick coupler and guide them to connect together smoothly. The alignment guiding structure for quick coupler includes a guiding sleeve 1.

The guiding sleeve 1 has an engaging end 11 and a guiding end 12, and internally defines a guiding passage 13 extended between the engaging end 11 and the guiding end 12. The engaging end 11 defines an engaging bore 111, which is communicable with the guiding passage 13. The male coupler 2 is inserted into guiding passage 13 to assemble to the guiding sleeve 1 via the engaging bore 111.

The male coupler 2 includes a fitting section 21 and an inserting section 22. The fitting end 21 includes a flange 211 and a neck portion 212. The engaging bore 111 at the engaging end 11 of the guiding sleeve 1 is internally provided with a stepped section 112. The inserting section 22 of the male coupler 2 is inserted through the engaging bore 111 into the guiding passage 13 in the guiding sleeve 1 to thereby assemble to the guiding sleeve 1, while the flange 211 formed around the fitting section 21 of the male coupler 2 is abutted against the stepped section 112 in the engaging bore 111, such that the male coupler 2 is axially limited from moving further into the guiding sleeve 1. Alternatively, the male coupler 2 may be connected to the guiding sleeve 1 by way of tight fitting without being particularly restricted thereto.

The guiding end 12 defines a guiding bore 121 communicable with the guiding passage 13, and the guiding bore 121 has an inner wall formed into a beveled guiding surface 1211. The female coupler 3 can be guided by the guiding end 12 into the guiding passage 13 to connect to the male coupler end to end.

According to the design of the present invention, the male coupler 2 is firstly inserted into the guiding sleeve 1, such that the inserting section 22 of the male coupler 2 for connecting with the female coupler 3 is extended into the guiding passage 13. Then, use the guiding sleeve 1 to provide correction of a radial offset between the male and the female coupler 2, 3 that are to be connected end to end. For this purpose, the female coupler 3 is guided by the beveled guiding surface 1211 formed around the inner wall of the guiding bore 121 of the guiding sleeve 1 into the guiding passage 13. Since the guiding sleeve 1 and the male coupler 2 are arranged coaxially from the very beginning, the female coupler 3 having been successfully guided into the guiding passage 13 will be or close to be coaxial with the male coupler 2. In this manner, the radially offset male and female coupler 2, 3 are not directly connected end to end to cause wear at a joint of the two couplers 2, 3. Further, with the help of the guiding sleeve 1, sealing elements disposed on the axially connected male and female couplers 2, 3 can maintain integral to ensure water tightness at water valves provided between the male and female couplers 2, 3 and avoid any risk of water leakage.

The guiding passage 13 of the guiding sleeve 1 has a diametrical size larger than that of the engaging bore 111, such that a limiting platform 131 is formed in the guiding passage 13 at a bottom thereof.

The diametrical size of the guiding passage 13 is slightly larger than an outer diameter of the female coupler 3. When the female coupler 3 is guided into the guiding passage 13 to connect to the male coupler 2 end to end, the female coupler 3 would eventually press against the limiting platform 131. In this manner, the male and female couplers 2, 3 of different models or having different lengths would not be inserted too deep into the guiding passage 13 to cause excessively compressed and accordingly permanently deformed springs that are provided in the male and female couplers 2, 3. The springs without elastic restoring force could no longer reset the valves in the male and female couplers 2, 3 to close the water ways.

Figure 3:
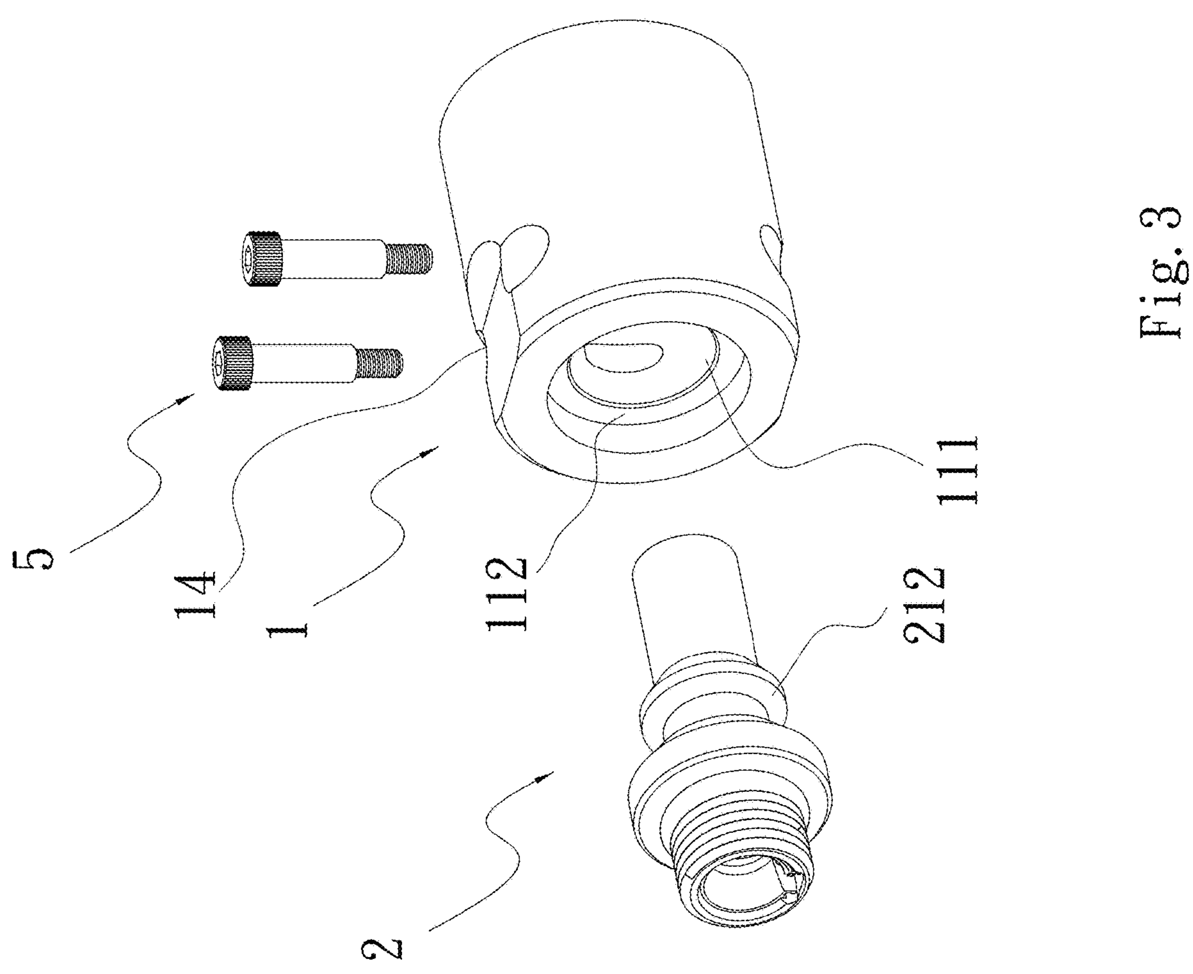
FIG. 3 is an exploded perspective view of an alignment guiding structure for quick coupler according to a second embodiment of the present invention.
Figure 4:
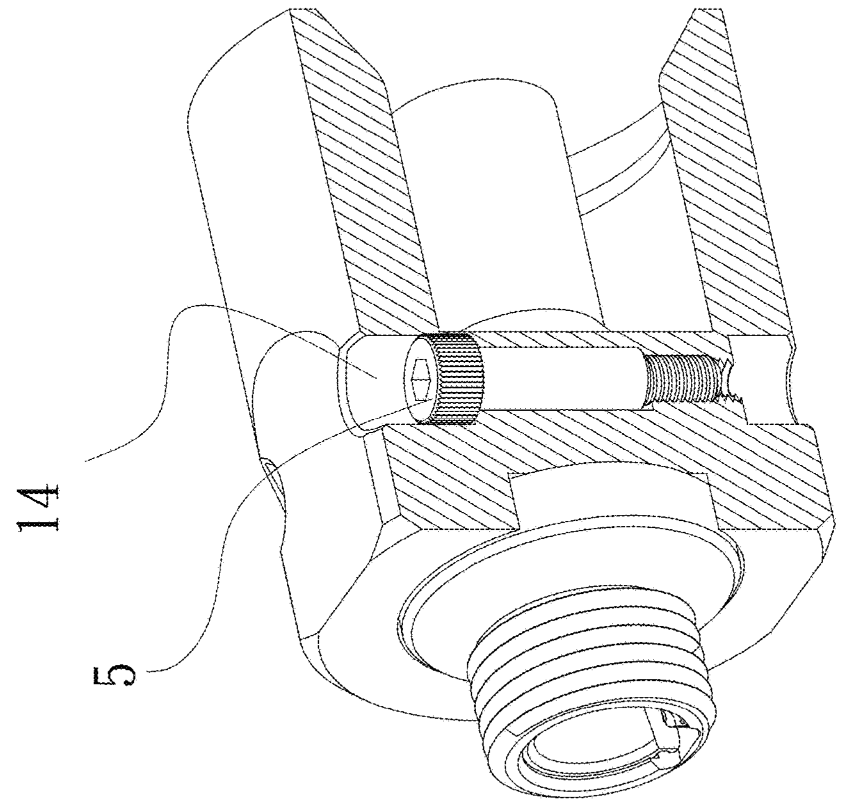
FIG. 4 is a cutaway view of the alignment guiding structure for quick coupler of FIG. 3.

Please refer to FIGS. 3 and 4, which are exploded perspective view and cutaway view, respectively, of an alignment guiding structure for quick coupler according to a second embodiment of the present invention. The second embodiment is generally structurally similar to the first embodiment but further has a penetrating bore 14 provided on an outer surface of the guiding sleeve 1. The penetrating bore 14 extends radially through the entire guiding sleeve 1 and is communicable with the guiding passage 13. Other parts of the second embodiment that are the same as those in the first embodiment are not repeatedly described herein.

When the male coupler 2 is connected to the guiding sleeve 1 in a non-tight fitting relation, a locating element 5 can be inserted into the guiding passage 13 of the guiding sleeve 1 via the penetrating bore 14. As in the first embodiment, when the male coupler 2 is inserted into the guiding sleeve 1, the flange 211 at the fitting section 21 of the male coupler 2 is abutted against the stepped section 112 in the engaging bore 111 of the guiding sleeve 1, preventing the male coupler 2 from being inserted axially too much into the guiding sleeve 1. Alternatively, the male coupler 2 may be assembled or held to the guiding sleeve 1 by welding, gluing, or any other suitable way.

When the locating element 5 is inserted into the guiding sleeve 1 via the penetrating bore 14, the locating element 5 is located at a position corresponding to the neck portion 212 of the male coupler 2. When the locating element 5 is engaged with the neck portion 212 of the male coupler 2, the male coupler 2 is prevented from being extracted axially out of the guiding sleeve 1. In the present invention, the locating element 5 can be a pin, a screw, a spring clip, or any other fixing element.

The guiding sleeve 1 further includes an axial slit. The axial slit axially extends from the engaging end 11 of the guiding sleeve 1 toward the guiding end 12 of the guiding sleeve 1. The engaging end 11 of the guiding sleeve 1 is divided by the axial slit into at least two radially apart portions, such that the engaging end 11 has a radially elastic clamping force. When the male coupler 2 is connected to the engaging end 11, the axial slit enables the engaging end 11 of the guiding sleeve 1 to elastically clamp on the male coupler 2. This elastic clamping force enables the guiding sleeve 1 to be fitted on around an outer side of the male coupler 2 without the need of using additional fixing elements.

Figure 5:
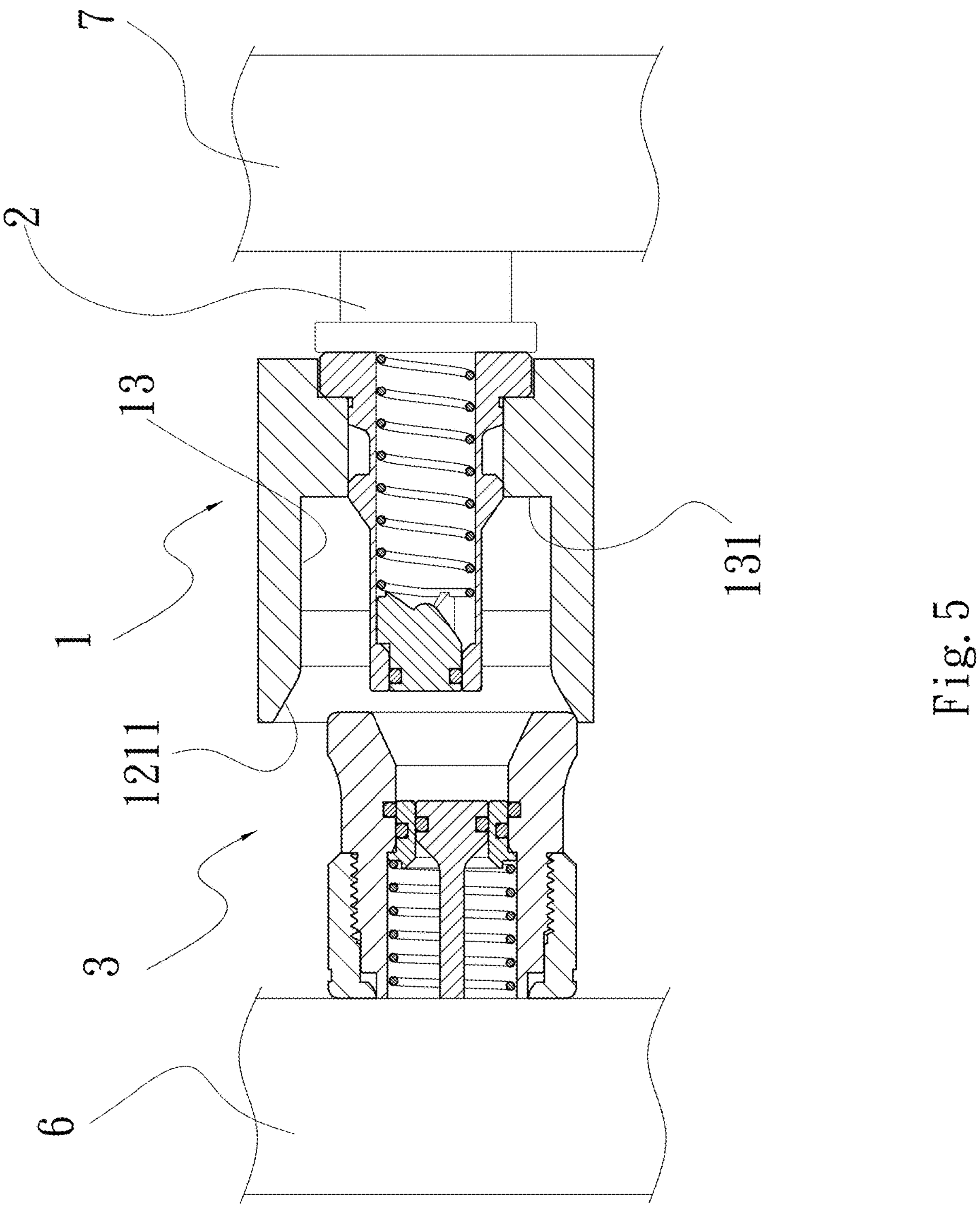
FIGS. 5 to 7 show the use of the alignment guiding structure of the present invention to connect two radially offset quick couplers to each other.
Figure 6:
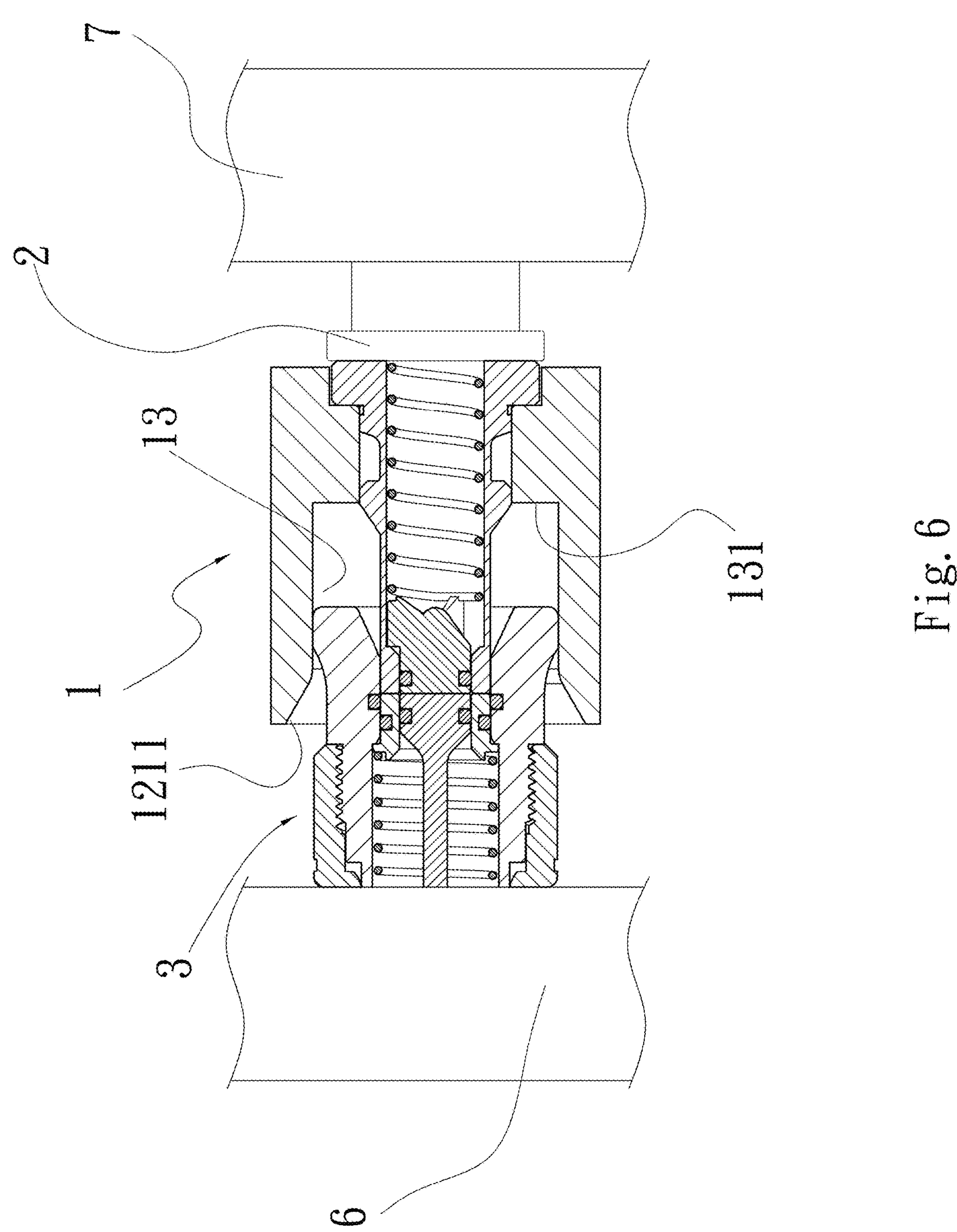
Figure 7:
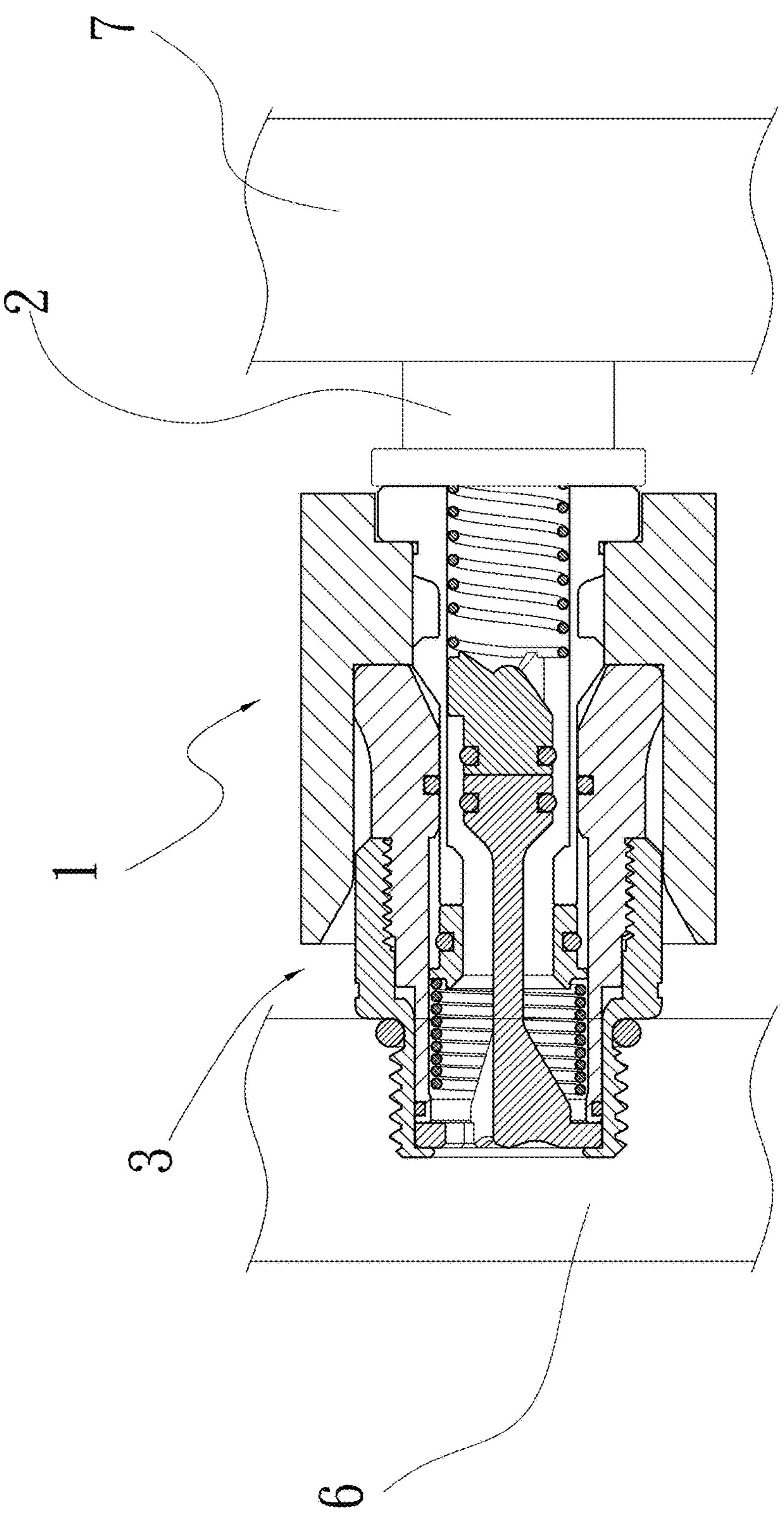

Please refer to FIGS. 5, 6 and 7, which show the use of the alignment guiding structure of the present invention to connect two radially offset quick couplers to each other. As shown, the left side in FIGS. 5 to 7 when viewing in front of the figures is defined as a fixed side, which is illustrated as a server cabinet 6. Elements on the fixed side or the server cabinet 6 include the female coupler 3 and other components mounted on the server cabinet 6. In explaining the present invention, only the female coupler 3 is described while other components are omitted herein. The right side in FIGS. 5 to 7 when viewing in front of the figures is defined as a movable side, and components and units located at the movable side are movable relative to the server cabinet 6. In explaining the present invention, the right side is illustrated as a server chassis 7 slidably mounted to the server cabinet 6. The alignment guiding structure of the present invention is connected to the movable side that is radially displaceable relative to the fixed side. When using the alignment guiding structure to guide the male and the female coupler 2, 3 to correct the radial offset between them, the movable side is radially displaced. In the present invention, there is not particular limit to the type of the units or components at the movable side, and other elements on the server cabinet 7 are not particularly described or shown.

The alignment guiding structure for quick coupler of the present invention is used under the premise of satisfying the Open Compute Project (OCP), the male and female couplers 2, 3 that meet the specifications under OCP are not allowed to change the specifications thereof arbitrarily by way of further machining or making any modification. Based on the above premise, the technical means adopted by the present invention to overcome the problem in the conventional way of correcting the radial offset between the male and female couplers is to assemble the male coupler 2 to the guiding sleeve 1 first, and then connect another end of the male coupler 2 to other movable components.

Since the female coupler 3 mounted on the fixed side (i.e. the server cabinet 6) is not located exactly coaxially with the male coupler 2 and there is a minor radial offset existed between the male and the female coupler 2, 3, such a radial offset must be corrected to an acceptable range of error before the male and the female coupler 2, 3 can be axially aligned and connected to each other end to end.

To overcome the radial offset between the male and the female coupler 2, 3, first enable an outer edge at a free end of the female coupler 3 to get in touch with the beveled guiding surface 1211 on the guiding sleeve 1. The beveled guiding surface 1211 is not intended for use in a closed waterway and is made of a material with relatively high wear resistance compared to other portions of the guiding sleeve 1, and is therefore suitable for contacting with the free end of the female coupler 3.

When the guiding sleeve 1 is continuously moved axially toward the female coupler 3, the beveled guiding surface 1211 in contact with the free end of the female coupler 3 is displaceable radially and brings the male coupler 2 connected thereto to move radially at the same time. When the female coupler 3 is completely located in the guiding passage 13, the male and the female coupler 2, 3 located in the guiding passage 13 are almost coaxial with the guiding sleeve 1 and the radial offset originally existed between the male and the female coupler 2, 3 is also gradually corrected to become almost zero. At last, the male coupler 2 is fully inserted into the female coupler 3 to connect with the female coupler 3 end to end.

In the present invention, the radial offset between the male and the female coupler 2, 3 is corrected gradually via the guiding sleeve 1 instead of forcing the male couple 2 directly into the female coupler 3. With the present invention, it is able to avoid wear of the male and the female coupler 2, 3 possibly occurred when the two couplers 2, 3 are connected with each other; and watertight connection can be ensured at all joints between the male and the female coupler 2, 3 and between all sealing elements and the male and female coupler 2, 3 without causing leakage at the water valves provided between the male and female couplers 2, 3.

The limiting platform 131 provided in the guiding sleeve 1 defines a depth in the guiding sleeve 1 by which the male and the female coupler 2, 3 of different specifications can be axially engaged with each other. Therefore, the male coupler 2 is prevented from being axially extended too deep into the female coupler 3, and conical surface formed on the outer side of the inserting section 22 of the male coupler 2 and conical surface provided on the inner bore of the female coupler 3 would not be excessively compressed against each other to cause frictional contact or stuck connection.

With the guiding sleeve 1 of the present invention, the guiding posts and guiding seats conventionally used to help correct the radial offset between the male and the female coupler and connect them end to end can be omitted to save a large amount of manufacturing cost and overcome the problem of narrow transition space between the server cabinet and the server chassis.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An alignment guiding structure for quick coupler for correcting radial offset existing between a male and a female coupler, the alignment guiding structure comprising a rigid guiding sleeve having a closed engaging end and an open guiding end and internally defining a guiding passage extended between the engaging end and the guiding end; the engaging end having an engaging bore communicable with the guiding passage; the male coupler being inserted into and assembled to the guiding sleeve via the engaging bore; the guiding end defining a guiding bore communicable with the guiding passage and having a free end formed into a beveled guiding surface; and wherein the female coupler is guided by the beveled guiding surface at the guiding end of the guiding sleeve to move into the guiding passage and is connectable to the male coupler end to end, wherein a penetrating bore is provided on an outer surface of the guiding sleeve and wherein a locating element is inserted into the guiding passage via the penetrating bore to assemble to the guiding sleeve, and wherein the locating element in the guiding passage limits axial insertion of the male coupler into the guiding passage via the engaging bore of the guiding sleeve.

2. The alignment guiding structure for quick coupler as claimed in claim 1, wherein the male coupler is connected to the guiding sleeve in a way of tight fitting.

3. The alignment guiding structure for quick coupler as claimed in claim 1, wherein the penetrating bore extends radially through the guiding sleeve and is communicable with the guiding passage.

4. The alignment guiding structure for quick coupler as claimed in claim 1, wherein the guiding passage of the guiding sleeve is internally provided with a limiting platform.

5. The alignment guiding structure for quick coupler as claimed in claim 1, wherein the locating element is a screw.

* * * * *